US010662554B2

(12) United States Patent
Jung et al.

(10) Patent No.: US 10,662,554 B2
(45) Date of Patent: May 26, 2020

(54) SPANDEX HAVING IMPROVED UNWINDING PROPERTIES AND ENHANCED ADHESIVE PROPERTIES WITH HOT MELT ADHESIVE AND METHOD FOR PREPARING SAME

(71) Applicant: HYOSUNG TNC CORPORATION, Seoul (KR)

(72) Inventors: Hyun Gee Jung, Bucheon-si (KR); Joo Hyun Cho, Suwon-si (KR); Yeon Soo Kang, Gunpo-si (KR)

(73) Assignee: HYOSUNG TNC CORPORATION, Seoul (KR)

( * ) Notice: Subject to any disclaimer, the term of this patent is extended or adjusted under 35 U.S.C. 154(b) by 70 days.

(21) Appl. No.: 16/069,515

(22) PCT Filed: Jan. 10, 2017

(86) PCT No.: PCT/KR2017/000311
§ 371 (c)(1),
(2) Date: Jul. 11, 2018

(87) PCT Pub. No.: WO2017/122982
PCT Pub. Date: Jul. 20, 2017

(65) Prior Publication Data
US 2019/0017196 A1      Jan. 17, 2019

(30) Foreign Application Priority Data

Jan. 15, 2016 (KR) .................. 10-2016-0005575
Jan. 9, 2017  (KR) .................. 10-2017-0003075

(51) Int. Cl.
*D01F 1/10*   (2006.01)
*D02G 3/32*   (2006.01)
(Continued)

(52) U.S. Cl.
CPC ............... *D01F 1/10* (2013.01); *C08L 75/08* (2013.01); *D01D 1/02* (2013.01); *D01D 1/06* (2013.01);
(Continued)

(58) Field of Classification Search
CPC . D01F 6/88; D10B 2321/121; D10B 2331/10; D10B 2331/12
See application file for complete search history.

(56) References Cited

U.S. PATENT DOCUMENTS 5,562,978 A * 10/1996 Jacobson ................. C08K 9/08
                                                     428/323
6,353,049 B1 * 3/2002 Doi .......................... D01F 1/10
                                                     524/430
(Continued)

FOREIGN PATENT DOCUMENTS

CN    1504593 A    6/2004
CN    1784443 A    6/2006
(Continued)

OTHER PUBLICATIONS

PCT International Search Report, PCT/KR2017/000311, dated Apr. 19, 2017, 4 pages.
(Continued)

*Primary Examiner* — Michael M Dollinger
(74) *Attorney, Agent, or Firm* — Fenwick & West LLP

(57) ABSTRACT

The present invention relates to a method for preparing spandex having improved unwinding properties and enhanced adhesive properties with a hot melt adhesive and, more specifically, to a method for preparing spandex by means of adding a polystyrene polymer to a polyurethane-urea solution which is a spinning solution. Therefore, when spandex is unwound, irregular ballooning, tension spikes and the like can be effectively improved and other physical
(Continued)

properties are unaffected. And the adhesive properties with a hot melt adhesive are enhanced.

2 Claims, 1 Drawing Sheet

(51) Int. Cl.
D02G 3/44 (2006.01)
D01D 1/02 (2006.01)
D01D 5/04 (2006.01)
D01F 6/70 (2006.01)
D01D 1/06 (2006.01)
C08L 75/08 (2006.01)
D01F 6/94 (2006.01)

(52) U.S. Cl.
CPC .............. *D01D 5/04* (2013.01); *D01F 6/70* (2013.01); *D02G 3/32* (2013.01); *D02G 3/44* (2013.01); *D01F 6/94* (2013.01); *D10B 2321/121* (2013.01); *D10B 2331/10* (2013.01); *D10B 2331/12* (2013.01); *D10B 2509/00* (2013.01)

(56) References Cited

U.S. PATENT DOCUMENTS

| 7,255,820 | B2 | 8/2007 | Lee et al. |
| 9,084,836 | B2 | 7/2015 | Martin |
| 2004/0106733 | A1 | 6/2004 | Lee et al. |
| 2004/0225101 | A1 | 11/2004 | Selling et al. |
| 2008/0319132 | A1 | 12/2008 | Lendlein et al. |
| 2011/0174317 | A1 | 7/2011 | Martin |
| 2016/0108237 | A1 | 4/2016 | Chung et al. |
| 2016/0194787 | A1 | 7/2016 | Bivigou Koumba et al. |

FOREIGN PATENT DOCUMENTS

| CN | 105008602 A | 10/2015 |
| KR | 2004-0047129 A | 6/2004 |
| KR | 10-2006-0077892 A | 7/2006 |
| KR | 10-2011-0040972 A | 4/2011 |
| KR | 10-2015-0019234 A | 2/2015 |
| WO | WO 2015-038977 A1 | 3/2015 |

OTHER PUBLICATIONS

Extended European Search Report, European Patent Application No. 17738611.7, dated Jul. 11, 2019, 8 pages.

First Office Action, Chinese Patent Application No. 201780006714.5, dated Jan. 6, 2020, 15 pages.

Kamide, K. et al., "Determination of Number-Average Molecular Weight of Atactic Polystyrene and Cellulose Diacetate by Vapeur Pressure Osmometry," The *British Polymer Journal*, vol. 15, No. 2, Jun. 1, 1983, pp. 91-94.

* cited by examiner

SPANDEX HAVING IMPROVED UNWINDING PROPERTIES AND ENHANCED ADHESIVE PROPERTIES WITH HOT MELT ADHESIVE AND METHOD FOR PREPARING SAME

TECHNICAL FIELD

The present invention relates to a spandex having improved unwinding properties and enhanced adhesive properties with a hot melt adhesive and a method for manufacturing the same, and more particularly, to a method for manufacturing a spandex having improved unwinding properties and enhanced adhesive properties with a hot melt adhesive by means of adding a polystyrene-based polymer having a number average molecular weight of 50,000 to 150,000 to a polyurethane-urea solution which is a spinning solution. Thereby, when spandex is unwound, not only can phenomenon such as irregular ballooning, tension spikes and the like be efficiently improved, but also the adhesive properties with a hot melt adhesive are enhanced.

BACKGROUND ART

Spandex maintains high rubber elasticity, and has excellent physical properties such as tensile stress and recoverability. Therefore, it is widely used in underclothes, socks, sportswear, and the like. These types of spandexes, with their use expanding further, are now also being applied as functional fibers, for instance, for specific applications such as for diapers or as medical fibers, and the like.

Compared to general fibers for medical use, the conventional medical spandex fibers have a higher yarn adhesion between the fiber yarns. This contributes to poor unwinding properties, resulting in many broken yarn during the post-process procedures such as covering, warping, knitting, and the like, and also generates static electricity which causes tension between the yarns to be non-uniform.

Therefore, in an attempt to improve this problem, it is common to add an anti-adhesive to the polymer to enhance the characteristics of the polymer.

The conventionally used anti-adhesives were generally inorganic-based (Mg-st or Ca-st, Zn-st), but these additives are dispersed in the polymer solution without being dissolved therein, thus, there was a problem of the substance not being evenly distributed on the surface of the yarn. Therefore, when these additives were applied in diaper manufacturing problems occurred in the unwinding properties of the spandex.

In order to solve the problems of unwinding properties, and the like, of such spandexes, conventionally, KR 2011-0128884 A proposes an elastic fiber comprising a polyurethane or polyurethane-urea and a soluble anti-adhesive composition of about 0.5 wt. % to 25 wt. %. Here, a cellulose-based composition (CAB) is used as an anti-adhesive.

Further, JP 2001-509877 A, directed to a spandex having low viscosity and a method for producing said spandex, proposes using amides such as ethylene bis-oleylamide/ stearamide, etc. containing nitrogen as an anti-adhesive, and CN 001291079 B discloses using antimicrobial substance such as zirconium phosphate, glass and zeolite as an anti-adhesive of spandex.

However, although the anti-adhesive applied in the conventional manufacturing of spandex prevented adhesion between the fiber yarns to a certain extent, it was found that, depending on the addition of the inorganic substance to the anti-adhesive, irregular ballooning and tension spike phenomenon occurring in the unwinding process of the spandex yarn during the diaper manufacturing process were not properly improved. In addition, the above problem is still not solved with an organic-based adhesive agent due to the yarn becoming loose, deterioration of adhesive properties with the hot melt, and compatibility problem with spandex polymer.

Furthermore, in order to improve adhesion with the hot-melt adhesive, there have been cases where an adhesion enhancer was added to an emulsion, or thermoplastic polyurethane or a rosin-based compound and the like was added to the polymer during the production of the spandex fiber. However, when adhesion enhancer was added to the emulsion, there was a problem resulting from non-uniform application on the surface of the yarn due to uneven distribution in the emulsion. Further, when thermoplastic polyurethane was applied to the polymer adhesion did not improve, and when rosin-based compound was added to the polymer there was a problem that the unwinding tension of the spandex fiber became high resulting in inadequate unwinding properties.

PRIOR ART DOCUMENTS

Patent Literature (Patent Literature 1) KR 2011-0128884 A
(Patent Literature 2) JP 2001-509877 A
(Patent Literature 3) CN 001291079 B

DISCLOSURE OF INVENTION

Technical Problem

The present invention aims to solve the above-mentioned problems of the prior art by efficiently improving irregular ballooning and tension spikes phenomenon occurring in the spandex unwinding process, and enhancing adhesive properties with a hot melt adhesive without affecting the physical properties.

Accordingly, it is an object of the present invention to provide a spandex having enhanced adhesive properties with a hot melt adhesive, without irregular ballooning, tension spikes phenomenon and the like during the unwinding process, and a method for manufacturing the same.

Technical Solution

In order to solve the above-mentioned problems, the present invention provides a spandex in which a polystyrene-based polymer having a number average molecular weight of 50,000 to 150,000 is added to the polyurethane-urea spinning stock solution in an amount of 0.1 wt. % to 10 wt. % with respect to the solid content of the polyurethane-urea spinning stock solution, and which is used for hygiene purposes, has no fluctuation in the $5^{th}$ unload force among the physical properties of the yarn, and has a 20% or higher decrease in the unwinding tension value (Ave.) and improved adhesive properties by 10% or more compared to when polystyrene-based polymer is not added.

The present invention further provides a method for manufacturing spandex having improved unwinding properties and enhanced adhesive properties with a hot melt adhesive comprising the steps of preparing a polyurethane-urea spinning stock solution; preparing a spinning solution by adding a polystyrene-based polymer having a number average molecular weight of 50,000 to 150,000 in a slurry state to a polyurethane-urea spinning stock solution in an amount of 0.1 wt. % to 10 wt. % with respect to the solid content of the polyurethane-urea spinning stock solution; and spinning and winding the spinning solution.

Furthermore, the present invention also provides a spandex manufactured by the above manufacturing method.

Effects of the Invention

When spandex is prepared according to the present invention, a polystyrene-based polymer having a number average molecular weight of 50,000 to 150,000 in a slurry state is added to a spandex fiber spinning stock solution, thereby the conventional phenomenon of irregular ballooning and tension spikes occurring during unwinding of spandex yarn in the diaper manufacturing process due to addition of inorganic anti-adhesive (Mg-st, Ca-st, Zn-st) can not only be efficiently improved, but also adhesive properties with a hot melt adhesive which is necessary for use in diaper manufacturing can be enhanced.

The additive is similar or identical in chemical structure to a base polymer and a tackifier resin, which account for 60% to 70% or more of the hot-melt adhesive component. Thus, the additive has excellent miscibility when applied at a high temperature of 160 to 200 degrees Celsius, and when a high temperature hot melt adhesive is sprayed on the surface of the spandex, temperature of the additive present on the surface of the yarn rises above the transition temperature of glass, thereby facilitating adhesion.

BEST MODES FOR CARRYING OUT THE INVENTION

Figure 1:
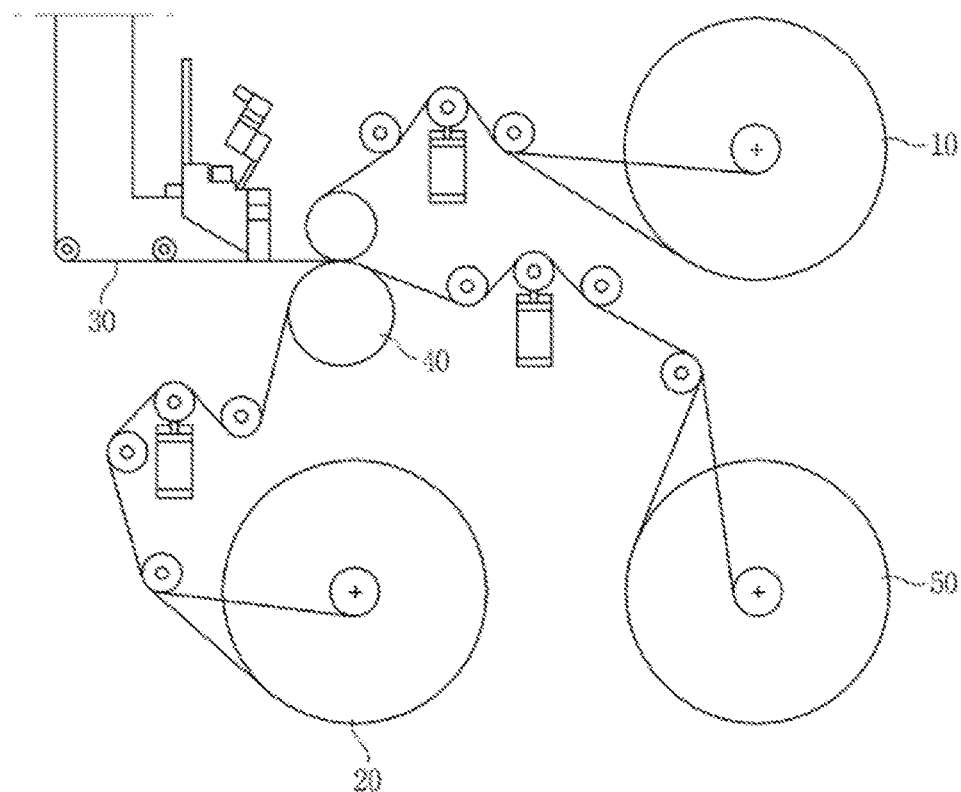
FIG. 1 shows equipment for preparing a sample for evaluation of creep in Experimental Example 2 according to the present invention.

Hereinafter, the present invention will be described in more detail by an embodiment.

The present invention relates to a novel method for manufacturing a spandex wherein a polystyrene-based polymer having a number average molecular weight of 50,000 to 150,000 is added in a slurry state to a polyurethane-urea solution which is a spinning solution, to improve unwinding properties and enhance adhesive properties with a hot melt adhesive.

The method for manufacturing a spandex according to the present invention will be described in more detail.

The present invention relates to a method for manufacturing polyurethane-urea elastic yarn comprising the steps of preparing a prepolymer having an isocyanate group at both terminals of a polyol by reacting a polyol with an excess of diisocyanate compound; dissolving the prepolymer in an organic solvent, and then reacting diamine and monoamine to prepare a polyurethane-urea spinning stock solution; preparing a spinning solution by adding a polystyrene-based polymer represented by the following chemical formula 1 to the polyurethane-urea spinning stock solution; and spinning and winding the spinning solution.

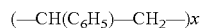  [Chemical Formula 1]

wherein x is an integer of 1 or more.

Here, the number average molecular weight of the polystyrene-based polymer is preferably 50,000 to 150,000. When the number average molecular weight of the polystyrene-based polymer is less than 50,000, a problem of power degradation may occur due to partial elastic loss. On the other hand, when the polystyrene-based polymer has a number average molecular weight exceeding 150,000, the polystyrene-based polymer is not uniformly dissolved in the solvent during preparation of the slurry, or not uniformly dissolved during manufacturing of spandex, leading to partial elastic loss which may affect power degradation, deterioration of adhesive properties with the hot melt adhesive, unwinding properties and physical properties.

In addition, the polystyrene-based polymer is preferably added in an amount of 0.1 wt. % to 10 wt. % with respect to the total weight of the solid content of the polyurethane-urea spinning stock solution.

If the content of the polystyrene-based polymer is less than 0.1 wt. % it is not effective in improving the unwinding properties and enhancing adhesive properties with the hot-melt adhesive, and if the content exceeds 10 wt. % it is not preferable because it affects power degradation among the physical properties of yarn.

Further, the polystyrene-based polymer is added in a slurry state to a spinning solution, because when it is added to the polymer it causes changes in the basic physical properties of the polymer. Therefore, it is added to the slurry so as to exhibit only improved unwinding properties and enhanced adhesive properties with the hot melt. At this time, the slurry state is preferable to be prepared and used as a DMAc solution.

Meanwhile, non-limiting examples of the diisocyanate used in the manufacturing of spandex of the present invention include 4,4'-diphenylmethane diisocyanate, 1,5'-naphthalene diisocyanate, 1,4'-phenylene diisocyanate, hexamethylene diisocyanate, 1,4'-cyclohexane diisocyanate, 4,4'-dicyclohexylmethane diisocyanate, and isophorone diisocyanate, etc. and of these diisocyanates 4,4'-diphenylmethane diisocyanate and the like can be used, and it is preferable to use one or more of the above listed groups.

The polymer diol used in the present invention can be one of polytetramethylene ether glycol, polytrimethylene ether glycol, polypropylene glycol, polycarbonate diol, a copolymer of poly(tetramethylene ether) glycol and a mixture of alkylene oxide and lactone monomer, a copolymer of 3-methyl-tetrahydrofuran and tetrahydrofuran, and the like, or a mixture of two or more groups thereof, but is not limited thereto.

Conversely, diamines are used as a chain extender, and in the present invention it is preferable to use only ethylenediamine.

In addition, amines having one functional group such as diethylamine, monoethanolamine, dimethylamine, and the like can be used as a chain terminator of the polyurethane-urea, but the present invention is not limited thereto.

Further, in the present invention, in order to prevent discoloration and deterioration of physical properties of polyurethane-urea resulting from heat treatment, etc. accompanying ultraviolet rays, atmospheric smog and spandex processing, it is preferable to suitably combine a phenol-based compound, a benzofuranone-based compound, a semicarbazide-based compound, a benzotriazole-based compound, a polymeric tertiary amine stabilizer, and the like having steric hindrance, and add it to the spinning stock solution.

Furthermore, the polyurethane-urea elastic yarn of the present invention may contain additives such as titanium dioxide, magnesium stearate and the like in addition to the above components.

When spandex is manufactured by the above-described method according to the present invention, not only is the adhesive properties excellent, but also the unwinding tension is uniform thereby preventing irregular ballooning phenomenon and improving tension spike phenomenon, and the adhesive properties with a hot melt adhesive which is necessary for diaper manufacturing are enhanced.

Hereinafter, the present invention will be described in detail through the examples, but the following examples and experimental examples merely illustrate one form of the present invention, and the scope of the present invention is not limited thereto.

EXAMPLES

Example 1

601.1 g of diphenyl methane-4,4'-diisocyanate and 2,664.5 g of polytetramethlene ether glycol (molecular weight: 1,800) were reacted in a stream of nitrogen gas under agitation at 90° C. for 95 minutes to prepare a polyurethane prepolymer having isocyanate at both ends.

After cooling the prepolymer to room temperature, 4,811 g of dimethyl acetamide was added to dissolve the prepolymer, thereby obtaining a polyurethane prepolymer solution.

Subsequently, 43.3 g of ethylene diamine, 13.4 g of 1,2-propylene diamine and 5.7 g of diethyl amine were dissolved in 829 g of dimethyl acetamide, and the resultant solution was added to the prepolymer solution at 9° C. or below to obtain a polyurethane solution. 1 wt. % of triethylene glycol-bis-3-(3-tertiary-butyl-4-hydroxy-5-methylphenyl)propionate which is an antioxidant and 1% titanium dioxide as a delustrant were added as additives with respect to the solid content of the polymer to obtain a spinning stock solution. In addition, a spinning solution was prepared by adding a polystyrene-based polymer having a number average molecular weight of 100,000 in slurry state to the spinning stock solution in an amount of 3 wt. % with respect to the solid content of the polymer.

The spinning solution was subjected to a dry spinning process at a spinning temperature of 260° C. or above and wound at a winding speed of 500 m/min to produce 800 dtex yarn.

Example 2

A spandex fiber was prepared in the same manner as described in Example 1, except that the additive polystyrene-based polymer (number average molecular weight: 100,000) was added to the spinning stock solution in an amount of 5 wt. % with respect to the solid content of the polymer.

Example 3

A spandex fiber was prepared in the same manner as described in Example 1, except that the additive polystyrene-based polymer (number average molecular weight: 100,000) was added to the spinning stock solution in an amount of 10 wt. % with respect to the solid content of the polymer.

Example 4

A spandex fiber was prepared in the same manner as described in Example 1, except that the additive polystyrene-based polymer (number average molecular weight: 70,000) was added to the spinning stock solution in an amount of 3 wt. % with respect to the solid content of the polymer.

Example 5

A spandex fiber was prepared in the same manner as described in Example 1, except that the additive polystyrene-based polymer (number average molecular weight: 120,000) was added to the spinning stock solution in an amount of 3 wt. % with respect to the solid content of the polymer.

COMPARATIVE EXAMPLES

Comparative Example 1

A spandex fiber was prepared in the same manner as described in Example 1, except that the additive polystyrene-based polymer (number average molecular weight: 100,000) was added to the spinning stock solution in an amount of 15 wt. % with respect to the solid content of the polymer.

Comparative Example 2

A spandex fiber was prepared in the same manner as described in Example 1, except that the additive polystyrene-based polymer (number average molecular weight: 100,000) was added to the spinning stock solution in an amount of 20 wt. % with respect to the solid content of the polymer.

Comparative Example 3

A spandex fiber was prepared in the same manner as described in Example 1, except that the additive polystyrene-based polymer (number average molecular weight: 40,000) was added to the spinning stock solution in an amount of 3 wt. % with respect to the solid content of the polymer.

Comparative Example 4

A spandex fiber was prepared in the same manner as described in Example 1, except that the additive polystyrene-based polymer (number average molecular weight: 200,000) was added to the spinning stock solution in an amount of 3 wt. % with respect to the solid content of the polymer.

Comparative Example 5

A spandex fiber was prepared in the same manner as described in Example 1, except that an anti-adhesive was not added to the spinning stock solution.

EXPERIMENTAL EXAMPLES

Experimental Example 1

Force(g) was measured by the following method for comparative evaluation of physical properties during repeated elongation of spandex fibers prepared in the above Examples and Comparative Examples.

The evaluation equipment used was MEL of Textechno Inc. and evaluation was conducted based on ASTM D 2731-72 standard. The equipment was gripped at sample intervals of 10 cm and repeated 5 times in total so as to elongate to 300%, and the force value of each elongated portion was measured. The results are shown in Table 1 below.

TABLE 1

| Item | Examples | | | | | Comparative Examples | | | | |
|---|---|---|---|---|---|---|---|---|---|---|
|  | 1 | 2 | 3 | 4 | 5 | 1 | 2 | 3 | 4 | 5 |
| $5^{th}$ unload force at 200% | 17.3 | 17.1 | 17.0 | 17.5 | 17.3 | 15.7 | 14.4 | 16.2 | 15.7 | 17.4 |

※$5^{th}$ unload force at 200%: force (g) of elongated portion at 200% after the fifth elongation and recovery Referring to Table 1, when polystyrene-based polymer having a number average molecular weight of 100,000 was added, there was no difference compared to Comparative Example 5 in which the anti-adhesive additive was not added. However, when polystyrene-based polymer was added in an amount exceeding 10 wt. % as in Comparative Examples 1 and 2, or polystyrene-based polymer having a number average molecular weight of less than 50,000 was added as in Comparative Example 3, or polystyrene-based polymer having a number average molecular weight exceeding 150,000 was added as in Comparative Example 4, there was a problem of the $5^{th}$ unload force being reduced.

Experimental Example 2

In order to evaluate adhesive properties of the spandex prepared in the Examples and Comparative Examples with the hot-melt adhesive, creep was evaluated by the following method. The results are shown in Table 2 below.

For this purpose, laminate was manufactured using nonwoven fabric and spandex fiber.

Here, the manufacturing equipment used was Pilot Coater of Nordson Corporation and its method is as follows. (See FIG. 1)

(1) A nonwoven fabric 1 (10) and a nonwoven fabric 2 (20) are fed, and a spandex yarn (30) is fed in parallel to the central part.

(2) Elongation when supplying spandex yarn is set to 250%, the hot melt adhesive of Henkel Company is supplied by a spiral spray method, and pressed through a nip roller (40) and bonded to the nonwoven fabric. At this time, the amount of glue is set to 60 mg/m.

(3) The manufacturing speed of the sample is set to 100 m/min.

The evaluation of creep is conducted by the following procedure using the manufactured laminate (50) via an evaluation method of the U INC. in Japan.

(1) The laminate portion is elongated to the maximum and fixed on a plastic plate of 30 cm in width and 50 cm in length.

(2) The left and right 100 mm (total 200 mm) portions from the central portion are marked with a permanent marker.

(3) The marked portions are cut with a sharp knife to measure the length of the portion sticking out of the spandex.

The creep (%) which is the adhesive property was calculated by the following Equation 1.

$$\text{Adhesive properties (creep) (\%)} = [200-(\text{length of the portion sticking out})]/200 \times 100 \quad \text{[Equation 1]}$$

The adhesion of the spandex fibers prepared in Examples 1 to 2 and Comparative Examples 1 to 5 was evaluated as described above and the results are shown in Table 2 below.

TABLE 2

| Item | Examples | | | | | Comparative Examples | | | | |
|---|---|---|---|---|---|---|---|---|---|---|
|  | 1 | 2 | 3 | 4 | 5 | 1 | 2 | 3 | 4 | 5 |
| Adhesive properties % | 83.2% | 85.3% | 86.6% | 84.3% | 83.9% | 87.3% | 88.1% | 75.2% | 69.3% | 71.3% |

Referring to Table 2, excellent adhesion properties were observed when polystyrene-based polymer having a number average molecular weight of 100,000 was added (Examples 1 to 3) and when polystyrene-based polymer having a number average molecular weight of 70,000 and 120,000 were added (Examples 4 and 5) compared to Comparative Example 5 in which polystyrene-based polymer was not added, to Comparative Example 4 in which polystyrene-based polymer having a high molecular weight was added, and to Comparative Example 3 in which polystyrene-based polymer having a low molecular weight was added.

However, excellent adhesion properties were also observed even in cases where polystyrene-based polymer was added in an amount exceeding 10 wt. % as in Comparative Examples 1 and 2, or additive having a number average molecular weight of less than 50,000 was added as in Comparative Example 3.

Experimental Example 3

The spandex fibers prepared in the above Examples and Comparative Examples were evaluated as follows in order to confirm the degree of uniformity of their unwinding properties in addition to adhesion.

Here, the yarn was treated in an oven at a temperature of 60° C. and relative humidity of 30% for 3 days, cooled at room temperature for 12 hours, and the tension value during unwinding at a speed of 100 m/min of 100 g of the inner layer of the yarn excluding the bobbin weight was measured.

The evaluation method of unwinding properties include evaluating by installing a guide for fixing the yarn at a position spaced 30 cm from the fixed bobbin holder, and installing a sensor capable of measuring tension and a winding device capable of controlling speed.

The tension measuring device used in the evaluation device is Electronic Tension Meter manufactured by ROTHSCHILD. The values of Maximum (Max), Minimum (Min), Average (Ave.) and Deviation (Dev.) were measured, and the results are shown in Table 3 below.

In the evaluation result it was observed that lower the difference between the Max values and the Min values, and lower the Ave values and the Dev values, superior the degree of uniformity of the unwinding properties.

TABLE 3

| Classification | Examples | | | | | Comparative Examples | | | | |
|---|---|---|---|---|---|---|---|---|---|---|
|  | 1 | 2 | 3 | 4 | 5 | 1 | 2 | 3 | 4 | 5 |
| Max (g) | 20.33 | 19.98 | 19.34 | 19.35 | 20.85 | 19.11 | 18.35 | 19.85 | 25.35 | 28.68 |
| Min (g) | 3.54 | 3.32 | 3.05 | 3.29 | 3.47 | 3.26 | 3.02 | 3.27 | 3.86 | 4.21 |
| Ave (g) | 11.22 | 10.68 | 10.35 | 10.74 | 11.45 | 10.33 | 9.95 | 10.66 | 12.49 | 14.39 |
| Dev (g) | 2.31 | 2.21 | 2.09 | 2.19 | 2.43 | 2.04 | 1.96 | 2.14 | 2.88 | 2.85 |

Referring to Table 3, improved unwinding tension levels were observed when polystyrene-based polymer having a number average molecular weight of 100,000 was added (Examples 1 to 3) and when polystyrene-based polymer having a number average molecular weight of 70,000 and 120,000 were added (Examples 4 and 5). In addition, it was observed that the unwinding tension values were superior compared to when no additives were added (Comparative Example 5).

Experimental Example 4

Over-end-take-off (OETO) unwinding evaluation was conducted on the spandex fibers prepared according to the above Examples and Comparative Examples.

The OETO unwinding evaluation was conducted using the following method.

When spandex fiber yarn package is unwound through the OETO method, the following three types of unwinding states are generated depending on the magnitudes of the centrifugal force acting on the yarn and the adhesion force formed between the yarns.

(A) Centrifugal force>Adhesion between yarns: Irregular ballooning occurs (B) Centrifugal force≈Adhesion between yarns: Irregular ballooning does not occur or is extremely small (C) Centrifugal force<Adhesion between yarns: Unwinding Impossible (Broken Yarn)

Figure 2:
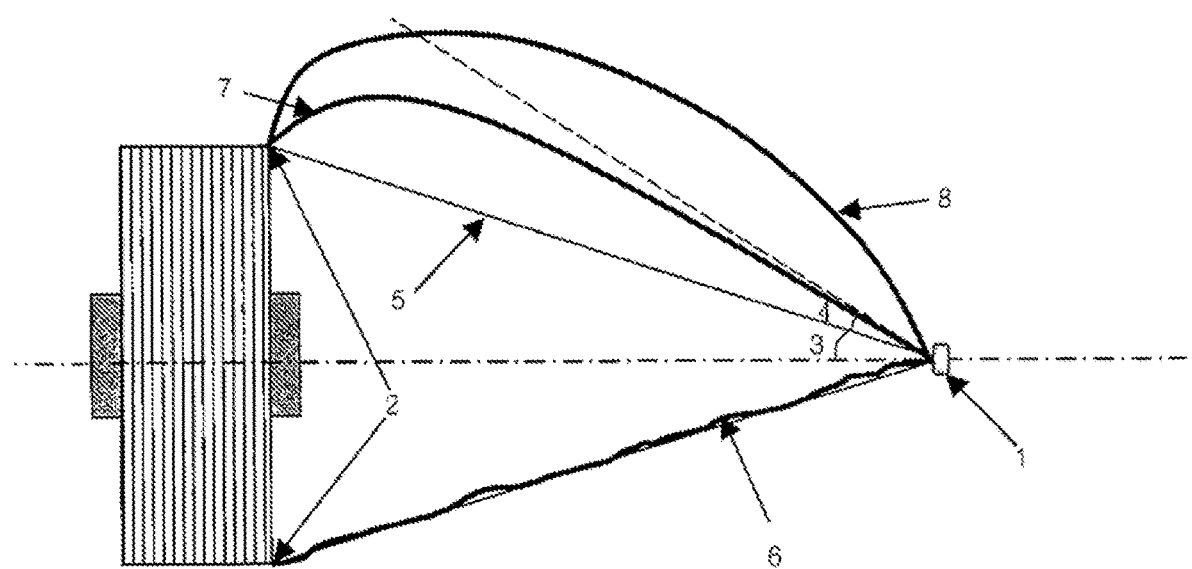
FIG. 2 is an evaluation standard graph showing OETO unwinding evaluation in Experimental Example 4 according to the present invention.

Reference is made to FIG. 2 for this unwinding evaluation, and reference signs in FIG. 2 indicate the following states.

Reference sign 1 denotes a fixed guide (1): the yarn moves by rotating via the OETO method, and then moves linearly from this point.

Reference sign 2 denotes an unwinding point (2) of the yarn package: it means a point at which the yarn receives tension and is unwound for the first time from the yarn package.

Reference sign 3 denotes an angle (3) formed by the unwound yarn and the line connecting the fixed guide to the center of the yarn package, at an ideal unwound state.

Reference sign 4 denotes an angle (4) corresponding to ½ of the angle of Reference sign 3, outside of the ideal unwinding angle.

Reference sign 5 denotes a grade 1 unwinding state (5): it shows a state in which the yarn is linearly unwound along the angle of reference sign 3 in an ideal unwinding state.

Reference sign 6 denotes a grade 2 unwinding state (6): it shows a state in which the yarn follows a path formed by the angle of reference sign 3, but with a slight tremor of the yarn.

Reference sign 7 denotes a grade 3 unwinding state (7): it shows a state in which the yarn has deviated from the path of the reference sign 3 resulting in the small ballooning becoming bigger, but has not deviated from the path of the reference sign 4 and thus is not likely to result in broken yarn.

Reference sign 8 denotes a grade 4 unwinding state (8): it shows a state in which ballooning of the yarn becomes even bigger, thereby leaving the path of reference sign 4 and highly likely to result in broken yarn depending on the surrounding circumstances.

The results of the OETO unwinding evaluation as described above are shown in Table 4 below.

TABLE 4

| Item | Examples | | | | | Comparative Examples | | | | |
|---|---|---|---|---|---|---|---|---|---|---|
|  | 1 | 2 | 3 | 4 | 5 | 1 | 2 | 3 | 4 | 5 |
| Unwinding Grade | 1 | 1 | 1 | 1 | 1 | 2 | 2 | 2 | 2 | 4 |

The results of Table 4 show that the examples according to the present invention exhibit superior unwinding properties compared to Comparative Examples 1 to 5.

REFERENCE SIGNS

1: Fixed Guide
2: Yarn Package Unwinding Point
3: The angle formed by the unwound yarn and the line connecting the fixed guide to the center of the yarn package.
4: The angle corresponding to ½ of the angle of reference sign 3.
5: The state in which the yarn is linearly unwound along the angle of reference sign 3 in an ideal unwinding state.
6: The state in which the yarn follows a path formed by the angle of reference sign 3, but with a slight tremor of the yarn.
7: The state in which the yarn has deviated from the path of the reference sign 3 resulting in the small ballooning becoming bigger, but has not deviated from the path of the reference sign 4 and thus is not likely to result in broken yarn.
8: The state in which ballooning of the yarn becomes even bigger, thereby leaving the path of reference sign 4 and highly likely to result in broken yarn.
10: Nonwoven Fabric 1
20: Nonwoven Fabric 2
30: Spandex Yarn 40: Nip Roller
50: Laminate

What is claimed is:

1. A spandex having improved unwinding properties and enhanced adhesive properties with a hot melt adhesive,
wherein a polystyrene-based polymer having a number average molecular weight of 70,000 to 120,000 is added to a polyurethane-urea spinning stock solution in an amount of 3 wt. % to 5 wt. % with respect to a solid content of the polyurethane-urea spinning stock solution, and which is used for hygiene purposes,
wherein the spandex has no more than 0.4 g of fluctuation in the $5^{th}$ unload force among the physical properties of yarn as measured at 200% elongation with evaluation conducted based on ASTM D 2731-72 standard,
wherein the spandex has a 20% or higher decrease in unwinding tension value on average that has been measured by making a yarn of the spandex and treated in an oven at a temperature of 60° C. and relative humidity of 30% for 3 days, cooled at room temperature for 12 hours, and the tension value during unwinding at a speed of 100 m/min of 100 g of an inner layer of the yarn excluding a bobbin weight was measured whereby unwinding properties are evaluated by installing a guide for fixing the yarn at a position spaced 30 cm from the bobbin holder, and measuring tension and a winding device capable of controlling speed,
wherein the spandex has adhesive properties of the spandex increased by 10% or more compared to when the polystyrene-based polymer is not added, the adhesive properties of the spandex measured as a creep percentage defined by equation (1) and by performing an evaluation method comprising (i) elongating a laminate portion to a maximum and fixed on a plastic plate of 30 cm in width and 50 cm in length, (ii) marking portions 100 mm at a left side and a right side of a central portion, and (iii) cutting the marked portions to measure the length of the portion sticking out of the spandex Creep percentage=[200−(length of the portion sticking out)]/200×100     Equation (1).

2. A method for manufacturing spandex having improved unwinding properties and enhanced adhesive properties with a hot melt adhesive comprising the steps of:
preparing a polyurethane-urea spinning stock solution;
preparing a spinning solution by adding a polystyrene-based polymer having a number average molecular weight of 70,000 to 120,000 in a slurry state to a polyurethane-urea spinning stock solution in an amount of 3 wt. % to 5 wt. % with respect to a solid content of the polyurethane-urea spinning stock solution; and
spinning and winding the spinning solution,
wherein the spandex is used for hygiene purposes and has no more than 0.4 g of fluctuation in the $5^{th}$ unload force among the physical properties of a yarn as measured at 200% elongation with evaluation conducted based on ASTM D 2731-72 standard, and
wherein the spandex has a 20% or higher decrease in unwinding tension value on average that has been measured by making the yarn of the spandex and treated in an oven at a temperature of 60° C. and relative humidity of 30% for 3 days, cooled at room temperature for 12 hours, and the tension value during unwinding at a speed of 100 m/min of 100 g of an inner layer of the yarn excluding a bobbin weight measured by installing a guide for fixing the yarn at a position spaced 30 cm from a fixed bobbin holder, and measuring tension and a winding device capable of controlling speed,
wherein adhesive properties of the spandex is increased by 10% or more compared to when the polystyrene-based polymer is not added, the adhesive properties of the spandex measured as a creep percentage defined by equation (1) and by performing an evaluation method comprising (i) elongating a laminate portion to a maximum and fixed on a plastic plate of 30 cm in width and 50 cm in length, (ii) marking portions 100 mm at a left side and a right side of a central portion, and (iii) cutting the marked portions to measure the length of the portion sticking out of the spandex Creep percentage=[200−(length of the portion sticking out)]/200×100     Equation (1).

* * * * *